United States Patent [19]
Jabbari et al.

[11] Patent Number: 5,615,067
[45] Date of Patent: Mar. 25, 1997

[54] DISC CLAMP AND SPACER

[75] Inventors: Iraj Jabbari, San Jose; Thomas A. Hickox, Scotts Valley; Ramgopal Battu, Canoga Park, all of Calif.

[73] Assignee: Seagate Technology, Inc., Scotts Valley, Calif.

[21] Appl. No.: 167,863

[22] PCT Filed: Aug. 13, 1993

[86] PCT No.: PCT/US93/07652

§ 371 Date: Dec. 15, 1994

§ 102(e) Date: Dec. 15, 1994

[87] PCT Pub. No.: WO95/05660

PCT Pub. Date: Feb. 23, 1995

[51] Int. Cl.$^6$ .................................................. G11B 17/02
[52] U.S. Cl. .................................. 360/98.08; 360/99.12
[58] Field of Search ................................ 360/97.01, 98.01, 360/98.08, 99.05, 99.12; 369/270, 271

[56] References Cited

U.S. PATENT DOCUMENTS

| | | | |
|---|---|---|---|
| 4,945,432 | 7/1990 | Matsudaira et al. | 360/98.02 |
| 5,243,481 | 9/1993 | Dunckley et al. | 360/99.12 |
| 5,249,090 | 9/1993 | Fehse | 360/98.08 |

FOREIGN PATENT DOCUMENTS

| | | | |
|---|---|---|---|
| 63-103485 | 5/1988 | Japan | 360/99.12 |
| 4-102282 | 4/1992 | Japan | 360/98.08 |

OTHER PUBLICATIONS

IBM Technical Disclosure Bulletin; vol. 16, No. 12; Apr. 74; Griffiths et al; "Disk Pack Assembly".
IBM Technical Disclosure Bulletin; vol. 32, No. 6A; Nov. 89; "Disk Pack Assembly Design".
IBM Technical Disclosure Bulletin; vol. 32, No. 12; May 90; "Disk Stack Clamping Means".

Primary Examiner—Jefferson Evans
Attorney, Agent, or Firm—Edward P. Heller, III

[57] ABSTRACT

Magnetic hard discs are clamped on a disc spacer by integral spacer flanges. The spacer's diameter is slightly larger than the disc interior diameter thereby providing a radial clamping load. The discs are fit onto the spacer either by providing a small gap in the annulus of the spacer ring or by first cooling the spacer. The entire disc spacer and disc assembly is mounted on the drive spindle as a unit. A disc clamp clamps the assembly to a spindle flange by means of a lip on the interior of the spacer. The lip is preferably spaced axially below the top surface of the top most disc so that both the clamp and the clamp's mounting screw can be placed axially below the top surface of the top disc to thereby provide a low profile spindle/disc stack assembly. In another embodiment, the lip has an inclined surface to impart an additional radial load force to the top disc.

8 Claims, 6 Drawing Sheets

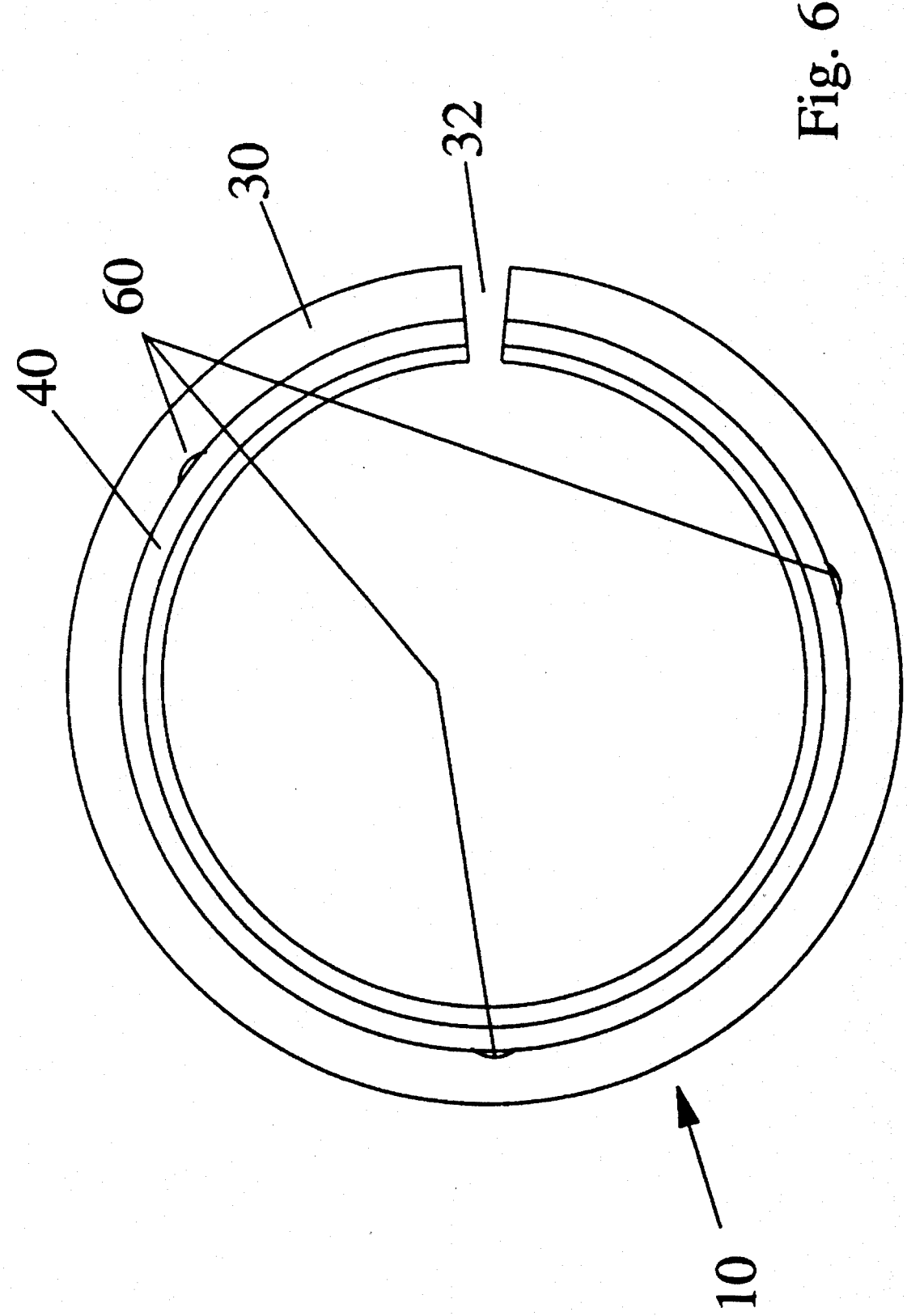

DISC CLAMP AND SPACER

FIELD OF THE INVENTION

The invention relates to the field of magnetic recording and in particular disc clamps and spacers for hard disc drive spindles and disc stacks.

BRIEF DESCRIPTION OF THE PRIOR ART

Disc clamps for magnetic hard disc drive spindles have as their primary objective the clamping of the magnetic hard discs in a stack onto the spindle so that the discs do not shift radially under shock. Such a radial shift, otherwise known in the industry as "disc slip", can result in total failure of the disc drive due to misalignment of the pre-recorded tracks on the slipped disc from the pre-recorded tracks on the other discs.

The primary method of disc clamps in the prior art is to provide a vertical clamping force on the top disc of a stack with the bottom disc of the stack abutting a spindle flange. The discs themselves are separated by spacers.

The required disc clamping force is determined by the shock specification of the disc drive. For example if the disc drive specification requires that the disc drive withstand a shock of 300 G's, a radial force must be applied to the disc on the order of three pounds. In order to achieve this force, the disc clamp must apply, for example, a 20 pound vertical clamping force because the coefficient of friction between the clamp and the disc is in the range of 0.15, which would translate a vertical or axial force of 20 lbs. into approximately 3 lbs. horizontal or radial force.

As disc drives become smaller, they are also becoming thinner. This puts severe constraints on the overall stack height of the disc/spindle assembly, which in turn, necessitates a reduction in the thickness of the discs and the height of the disc clamp above the spindle. As discs become smaller, there is also a tendency for the discs to warp into a potato chip shape due to the required clamping force of the disc clap to prevent "disc slip". For all the above factors, a new disc clamping approach is required.

One approach suggested in PCT Application No. WO93/06599 is to employ an annular clamp and spacer having a plurality of fingers exerting a radial pressure on a first disc and a plurality of projections bearing on a second disc to control radial movement of the first disc and the separation of the two discs.

Another approach is suggested in IBM Technical Disclosure Bulletin Vol. 32, No. 6, November 1989, page 129, Disc Pack Assembly Design, which describes the use of a grooved spliting to clamp a plurality of discs. Each disc rests in a groove in the ring which is squeezed and slipped into the internal diameter of the discs, when the ring is released it exerts a radial clamping force on the discs.

SUMMARY OF THE INVENTION

The invention comprises a disc spacer assembly having an integral flange which is interference tit against the inside circumferential rim of a magnetic disc. This interference tit is designed to apply to the disc the required radial force to resist "disc slip" that is traditionally applied by the clamp. The force of this disc spacer against the disc is provided by making the diameter of the spacer (flange) slightly larger than the inside diameter of the disc.

In a first embodiment, this invention provides a disc spacer comprising:

an annular spacer section and characterised by further comprising two integral flange sections depending from the spacer section to form a T-shape in the radial direction when viewed in cross section; and means for providing a predetermined radial load to the inside diameter of discs abutting the flanges.

In a preferred embodiment, the spacer has a small gap at one location in the annulus of the spacer, so that the spacer may be compressed into a smaller diameter. The compressed spacer is fitted into the inside diameter of the disc and is released to provide a spring force against the inside diameter of the disc. Alternatively, the radial load can be applied by first cooling the slightly oversized disc spacer (no gap) before insertion into the inside diameter of the disc, such that when the spacer warms to operating temperature it expands to provide the required spring force and load against the inside diameter of the disc.

In a second embodiment this invention provides a disc drive spindle assembly comprising:

a disc/spacer assembly comprising:

at least two discs each having an inside circumferential rim;

and characterised by also comprising;

a disc spacer having two integral flanges depending from the spacer section to from a T-shape in the radial direction when viewed in cross-section;

the height of each flange from the spacer section being less than the thickness of each disc;

the discs being mounted on said spacer with the respective discs having said inside rim abutting against respective of said spacer flanges with a predetermined radial force;

a spindle having a spindle flange;

the disc/spacer assembly mounted on said spindle with one of said two discs abutting said spindle flange and being sandwiched between the disc spacer's spacer section and the spindle flange;

a disc clamp mounted on the spindle and abutting an abutting surface of said disc spacer.

The disc spacer and disc assembly is mounted onto the disc drive spindle as an assembled unit and damped onto the disc drive spindle by means of a disc clamp which abuts against the disc spacer. Because the disc clamp in this configuration is not required to apply a vertical or axial load on the top surface of the top disc in the stack, the clamp is arranged to apply its clamping load on a lip on the inside diameter of the spacer assembly. This lip is arranged to be axially below the top surface of the top most disc, such that, both the top of the clamp and the clamp's screw lie axially at or below the top surface of the top disc of the disc stack.

In an alternative arrangement, the abutting surface of the lip of the disc clamp is slightly inclined, such that the disc clamp, when applying force to the lip, applies not only a vertical (axial) force but also, by means of force translations caused by the inclined surface, a radial force on the top most disc of the disc stack to provide additional clamping force to maintain the top most disc in radial alignment.

Another feature of the present invention comprises spacing the bottom most disc spacer flange slightly away from the flange of the spindle upon which the disc stack is clamped, such that the three applied to the lip of the disc spacer is applied to the lower disc in the disc stack in a vertical or axial direction, sandwiching and clamping the lower disc between the disc spacer portion of the disc spacer assembly and the spindle flange. This additional axial load translates, as above mentioned, into an additional radial load to assist in preventing "disc slip".

An additional feature of the present invention lies in providing a small cut or notch between the flange section and the disc spacer section of the disc spacer assembly, such that the disc spacer flange may be physically deformable in the radial direction. This assists in applying a radial load in a uniform manner to the inside diameter of the disc.

BRIEF DESCRIPTION OF THE DRAWINGS

FIG. 6, is a top plan view of a disc spacer according to the present invention, including disc warping control bumps.

DETAILED DESCRIPTION OF THE PREFERRED EMBODIMENT

Figure 1:
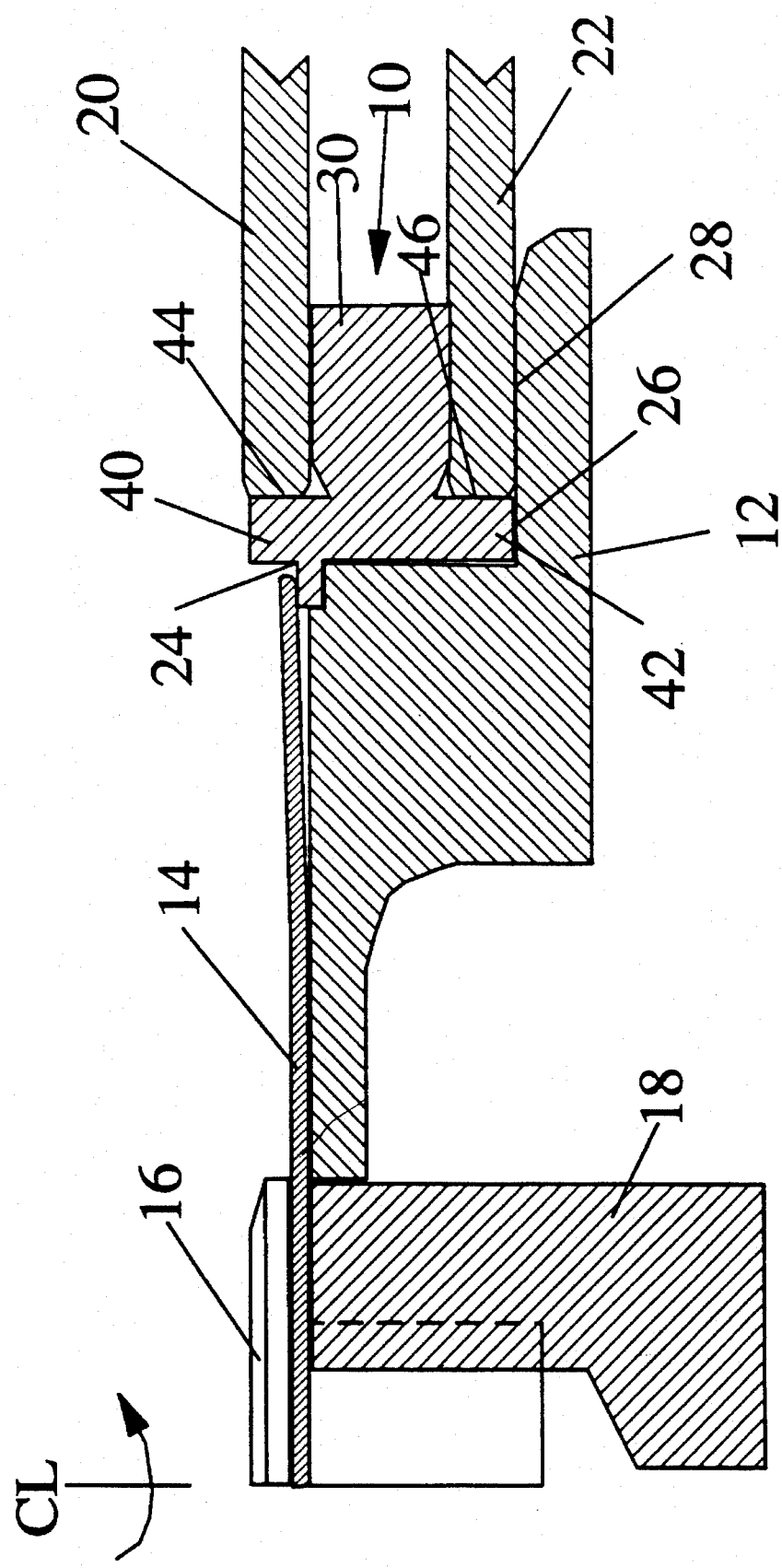
FIG. 1, is a partial cross sectional view of a disc drive spindle having a disc spacer assembly according to the present invention.

Referring mow to FIG. 1, the preferred disc spacer assembly 10 is shown mounted on a disc drive spindle flange 12 by means of a actual clamping force applied by disc clamp 14 through clamp screw 16 in a disc drive rotating spindle shaft 18. The disc spacer assembly 10 comprises a disc spacer section 30 and two integral flanges 40 and 42 extending from the inside diameter of the spacer section 30, such as to form a T in cross section when viewed towards the inside diameter of the spacer assembly. Two magnetic hard discs 20 and 22 are mounted on the spacer 10 such that they both ride upon the spacer section 30 of the spacer assembly and are abutting at their inside diameter 44 and 46 respectively against the respective flange sections 40 and 42 of the spacer assembly 10. The axial clamping force applied by disc clamp 14 is applied against a lip 24 which extends radially inward from the disc spacer assembly 10 below the top surface of the flange 40, which is in turn axially below the top surface of the disc 20. By means of this arrangement, the top of the clamp screw 16 is also at or below the top surface of the top disc 20.

The lower flange 42 of the disc spacer assembly 10, is arranged such that there is a small gap 26 between the bottom surface of this flange and the adjacent surface of spindle flange 12. By this arrangement the axial force applied by the disc clamp 14 is transmitted by the spacer section 30 to the lower disc 22, thereby sandwiching the lower disc 22 between the disc spacer section 30 and the spindle flange 12. This not only serves to maintain the entire assembly of the disc spacer 10 and connected discs 20 and 22 on the spindle flange 12, but also assists, by means of the frictional force between the three components to assist in applying additional radial load to the lower disc 22.

Figure 2:
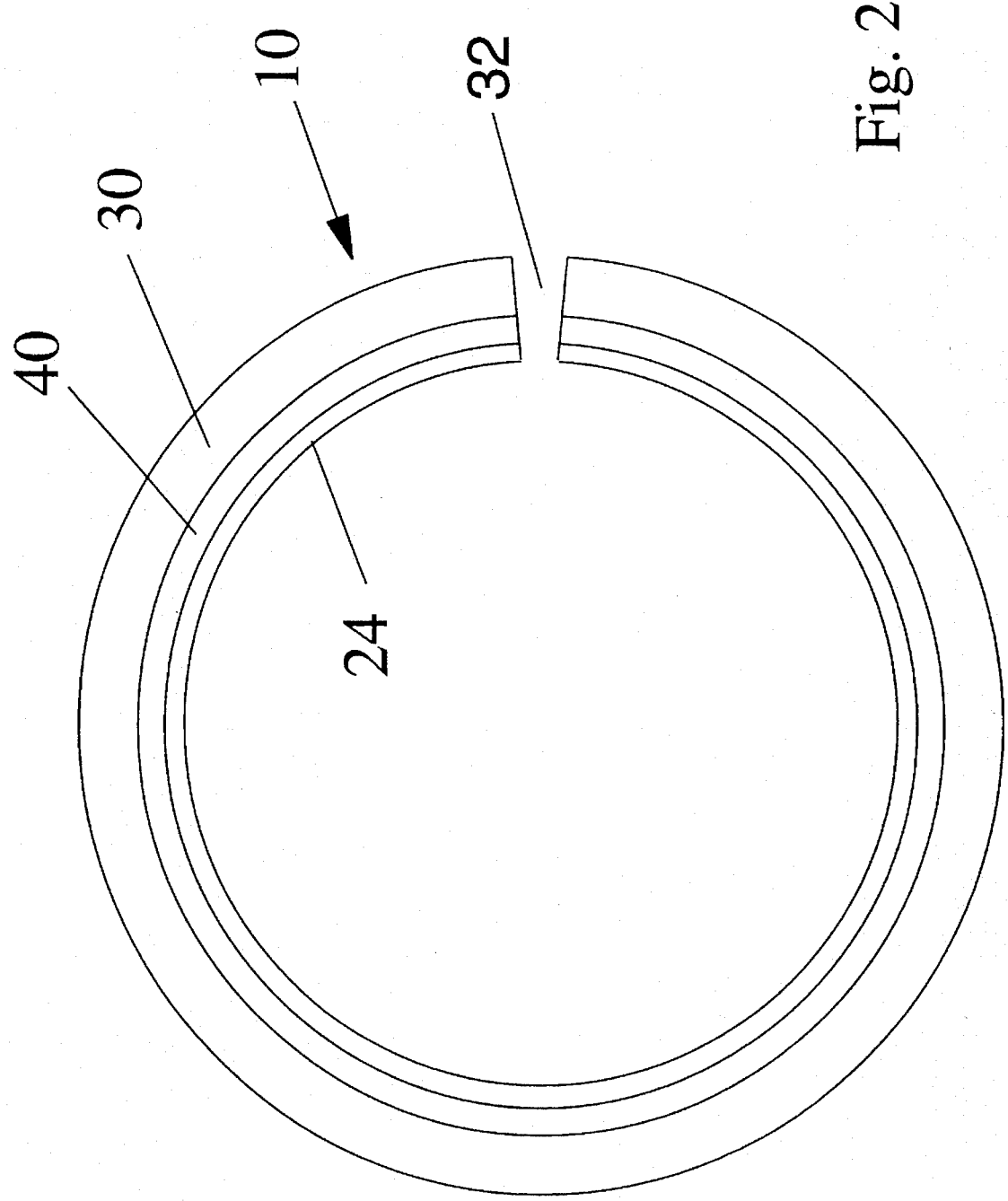
FIG. 2, is a top Plan view of the disc spacer assembly of the present invention.

Referring to FIG. 2, the disc spacer assembly 10 is shown in Top plan view. In this figure reference numerals 30, 40 and 24 refer respectively to the disc spacer second 30, upper flange to and lip 24. An additional feature shown in this figure and not shown in FIG. 1, is the small gap 32 in the spacer ring (annulus). This gap 32 provides the means by which the spring force of the spacer assembly 10, may be applied to the inside diameter of the discs 20 or 22. The diameter of the disc spacer assembly 10 is made such that it is slightly larger than the inside diameter of the disc 20 or 22. Spacer 10 must be compressed slightly by means of the gap 32 to fit within the inside diameter of the disc 20 and 22. Thereafter, when the compression is released, the resilience of the spacer assembly provides a spring force against the inside diameter of the disc 20 and 22. By proper arrangement of materials and amount of compression by means the proper selection of the diameter of the spacer assembly 10, the necessary and required radial load may be applied to the inside diameter of the disc to maintain it against required shock load. Again, as one of ordinary skill in the art will appreciate, the amount of load will be varied according to the various requirements of the various applications for which the disc drive is used. For example, if the disc drive is used in a portable computer, which is subject to being dropped, a higher shock load is required.

Figure 3:
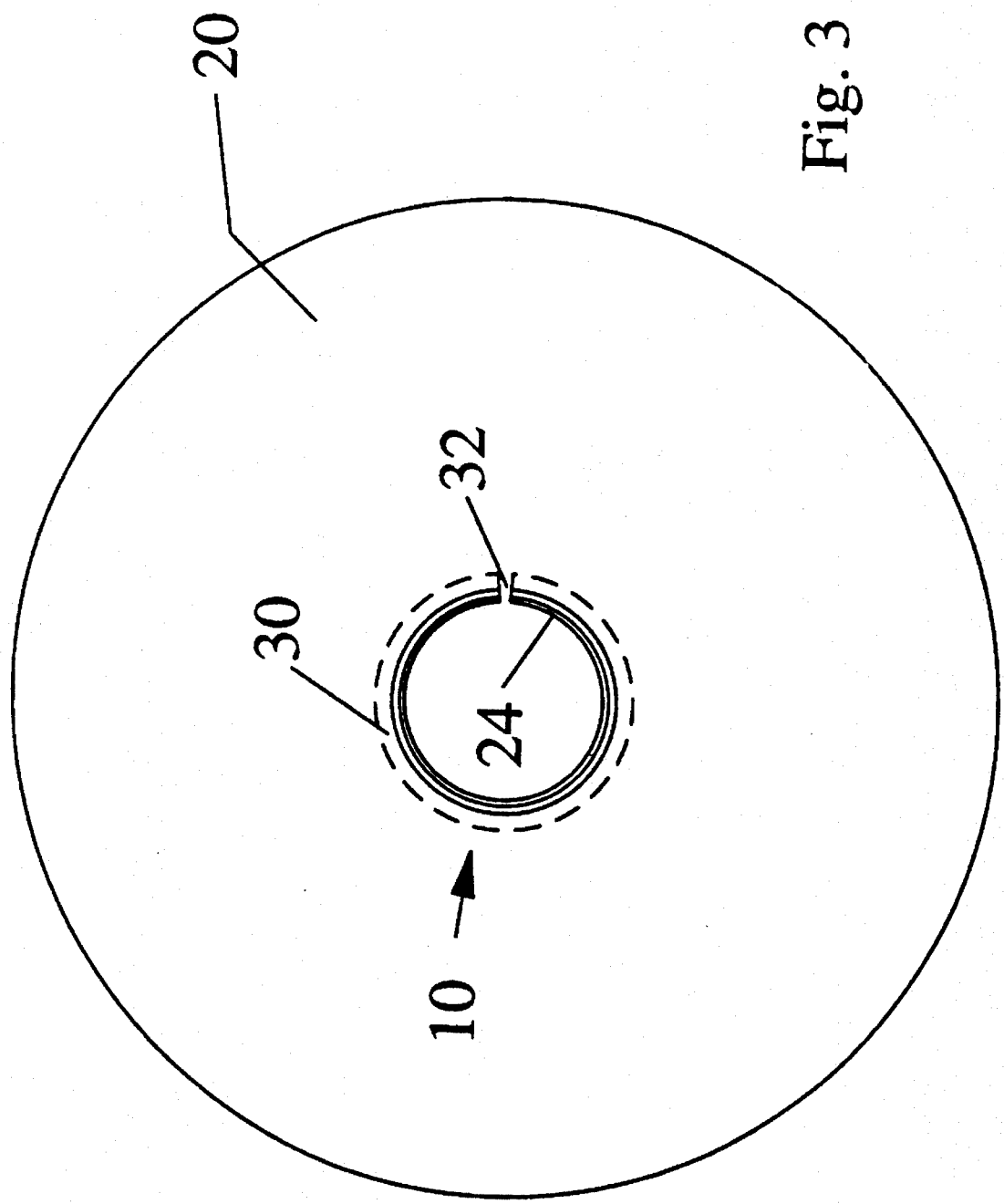
FIG. 3, is a top plan view of the disc spacer assembly of the present invention in a intereference fit arrangement with a magnetic hard disc.

FIG. 3, shows the disc clamp assembly 10, mounted in a disc 20. Shown in the figure are the disc spacer 10, the disc spacer section 30 in a phantom line and lip 24. With the discs mounted onto the disc spacer assembly 10, the combined units form a disc stack assembly which is mounted as a single structure to the disc drive spindle 12. This method of mounting eliminates the requirement to properly align the discs 20 and 22 when mounting them onto the spindle 12. Typically disc drive spindles are composed of steel, while the magnetic discs are composed of aluminium. This difference in materials causes a difference in coefficients of thermal expansion which will result in a forced "disc slip" if the inside diameter of the magnetic disc is abutting against the outside diameter of the steel spindle. When the discs are instead mounted on the disc spacer assembly of the present invention, the disc spacer assembly can be and preferably is made of the same material as the disc, thereby obviating any coefficient of thermal expansion mismatches and reducing, if not eliminating, any induced disc slip problem caused by materials differences between the spindle and the disc. Thus, as a result, the disc stack assembly comprised of the disc spacer assembly and magnetic discs 20 and 22 can be mounted as a unit on the disc spindle without the necessary steps of maintaining a radial separation between the two. Thus, in practice, the discs are first assembled onto the disc spacer assembly and the disc spacer assembly and disc stacks mounted around the spindle to abut against the spindle flange 12. Clamp 14 is then mounted onto the spindle shaft by means of clamp screw 16. This entire method of assembly is vastly improved in efficiency over any prior art approach.

Figure 4:
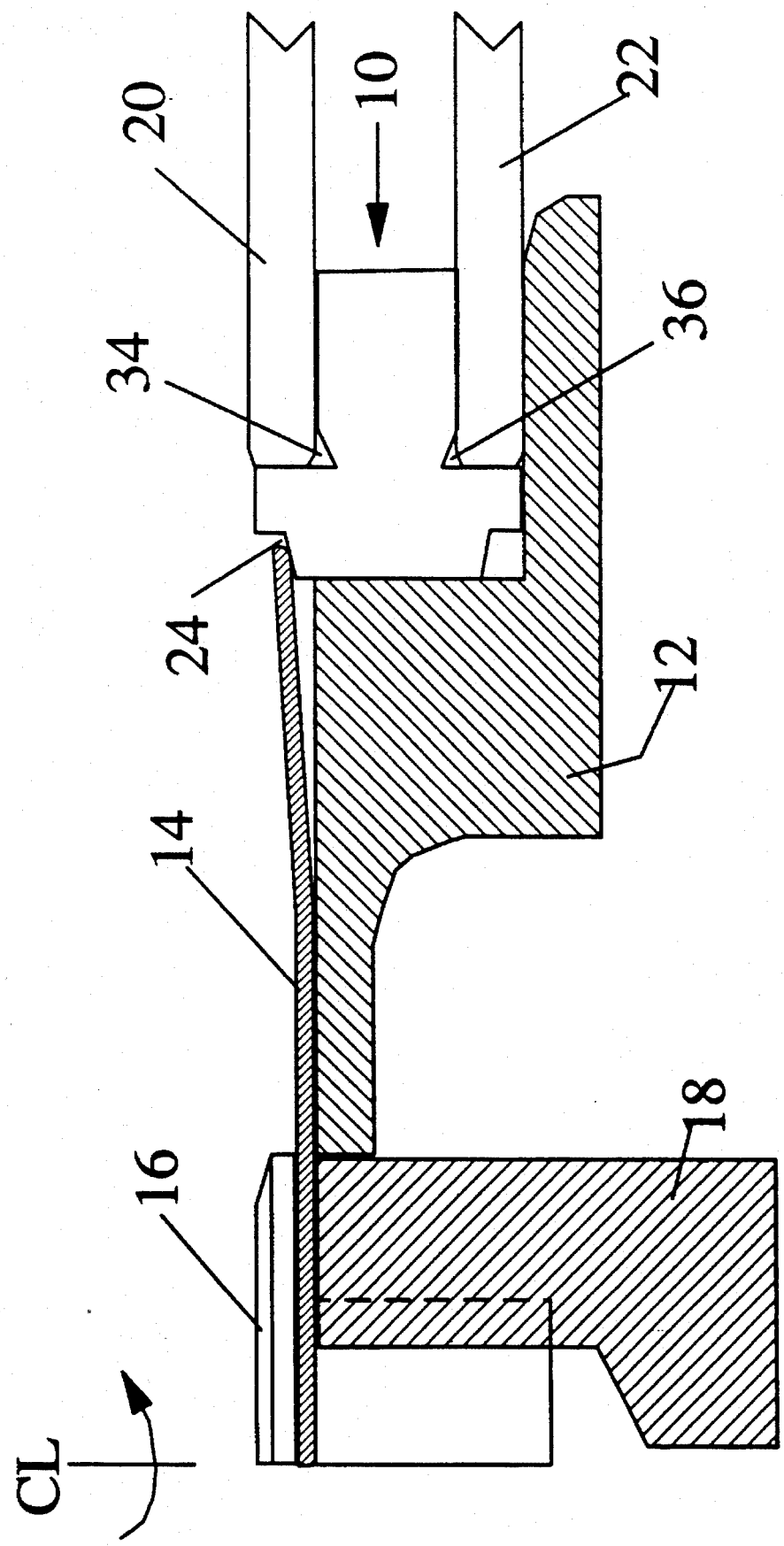
FIG. 4, is a partial cross sectional view of a disc drive spindle having an alternative disc spacer assembly according to the present invention.
Figure 5:
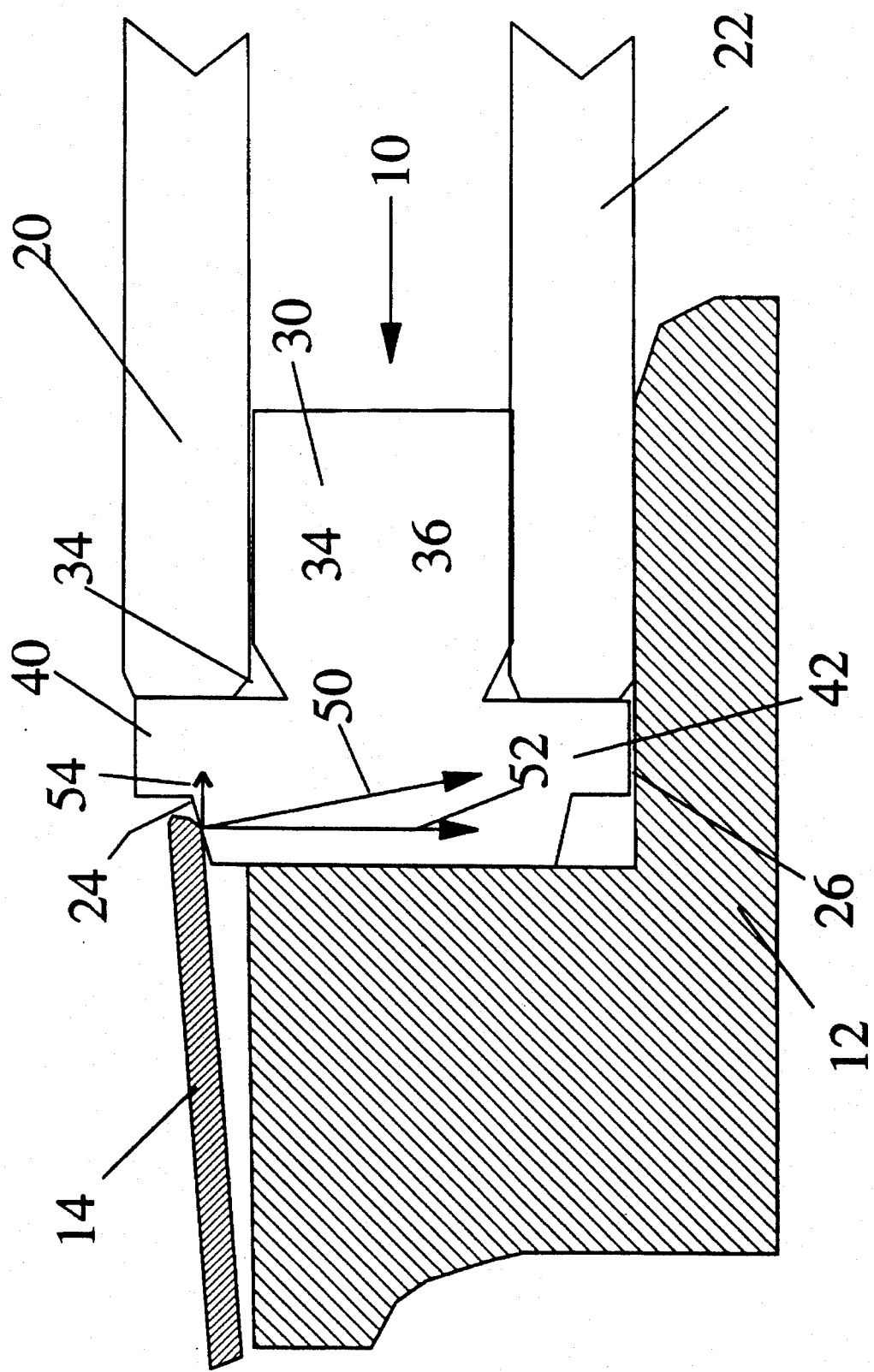
FIG. 5, is a detailed view of a portion of the alternative embodiment of FIG. 4, showing in particular the force vectors resulting from the actual load of the disc clamp on the inclined lip of the disc spacer assembly.

FIG. 4, shown an alternative disc spacer assembly 10 configuration, in which the lip 24 is provided with an included surface such that, as when in FIG. 5, the force applied by disc clamp 14, illustrated by arrow 50, is translated into axial three 52 and radial force 54. The axial force 52 behaves in the same fashion and for the same purposes as the axial force of the disc clamp in FIG. 1. However, the radial force 54 assists in providing an additional radial force against the inside diameter of the top disc 20. This arrangement will tend to equalise the amount of radial force applied to both the top disc 20 and to the bottom disc 22, because as before noted, the axial load of the disc clamp 14 on the disc spacer assembly 10 provides an additional radial holding force to the bottom disc 22 by means of the sandwiching effect of this disc 22 between the disc spacer section 30 and spindle flange 12.

As an additional feature, this version of the disc spacer assembly 10, includes cutouts 34 and 36 between the spacer section 30 and the flange sections 40 and 42 to thereby allow the flange section to be physically deformed in the radial direction because of the reduced material thickness at the respective cutouts 34 and 36. This radial deformability assists in the translation of the radial force from the disc clamp 14, to the inside diameter of the top disc 20.

An additional feature of this embodiment of the invention is that the disc spacer assembly flange sections may be made identical in structure so that the structure is symmetrical about a line drawn through the centre of the spacer. Thus, the spacer assembly 10 would have not true top and bottom flange (40 or 42), because they would be identical in structure. This would assist in the manufacturing process.

An additional feature of the present invention as shown, in connection with FIG. 6, which is top plan view of the disc spacer 10. In some disc drive applications, the required radial load to prevent "disc slip" can be so high that radial load would induce disc warping, otherwise known as "potato chipping". This warping if it is uncontrolled can result in an unacceptable disc runout performance. In such situations, the prior art has taught that if one controls the profile of the runout, the runout can provide an actual increase in disc performance. For example, U.S. Pat. No. 4,875,118 to Farid Kaymaram.

In FIG. 6, the controlled runout is provided by bumps 60 applied to the disc spacer flange 40 at predetermined radial spacings depending on the degree and profile desked. In the figure, there are three bumps 60 shown at radial spacings of 120° with one of the bumps being diametrically opposite the gap in the annulus at 32.

The discussion of the specific features of the preferred embodiments, should not be taken as a limitation on the scope of the invention in which we claim:

1. A disc spacer (10) comprising:

an annular spacer section (30) and characterized by further comprising two integral flange sections (40, 42) depending from the spacer section to form a T-shape in the radial direction when viewed in cross section;

means for providing a predetermined radial load to the inside diameter of discs abutting the flanges; and an integral lip formed on the inside diameter of said spacer, the lip having a disc clamp abutting surface axially below the top surface of the integral flange.

2. A spacer of claim 1 wherein said radial load is provided by said flanges applying spring forces to said discs.

3. A spacer of claim 2 wherein said means further comprise a gap in the annulus in the spacer.

4. A spacer of claims 1–3 wherein the disc clamp abutting surface is inclined relative to both the axial and radial directions of the spacer and is thereby adapted to translate a force applied to its surface into both axial and radial forces.

5. A spacer of claim 4 further including notches formed in the spacer at the intersection between the flanges and spacer sections of the spacer to thereby increase the radial deformability of the flanges under radial load.

6. A disc drive spindle assembly comprising:

a disc/spacer assembly (10) comprising:

at least two discs (20, 22), each having an inside circumferential rim (44, 46);

and characterised by also comprising;

a disc spacer (30) having two integral flanges (40, 42) depending from the spacer section to form a T-shape in the radial direction when viewed in cross-section;

the height of each flange from the spacer section being less than the thickness of each disc;

the discs being mounted on said spacer with the respective discs having said inside rim abutting against respective of said spacer flanges with a predetermined radial force;

a spindle (12) having a flange (28);

the disc/spacer assembly being mounted on said spindle with one of said two discs abutting said spindle flange and being sandwiched between the disc spacer's spacer section and the spindle flange;

a disc clamp (14) mounted on the spindle and abutting an abutting surface (24) of said disc spacer.

7. A disc drive spindle assembly of claim 6 further including at least three radially spaced bumps (60) formed on each disc spacer flange which provide a controlled interface between the respective flanges and discs to impart a controlled disc warp profile.

8. A disc drive spindle assembly of claim 6 or claim 7 wherein said disc spacer abutting surface comprises an inclined surface which translates a downward force applied by the disc clamp into both radial and axial forces, the radial three acting to increase the radial force of said spacer on the inside rims of said discs, the axial force acting to hold the disc/spacer assembly on said spindle flange.

* * * * *